UNITED STATES PATENT OFFICE.

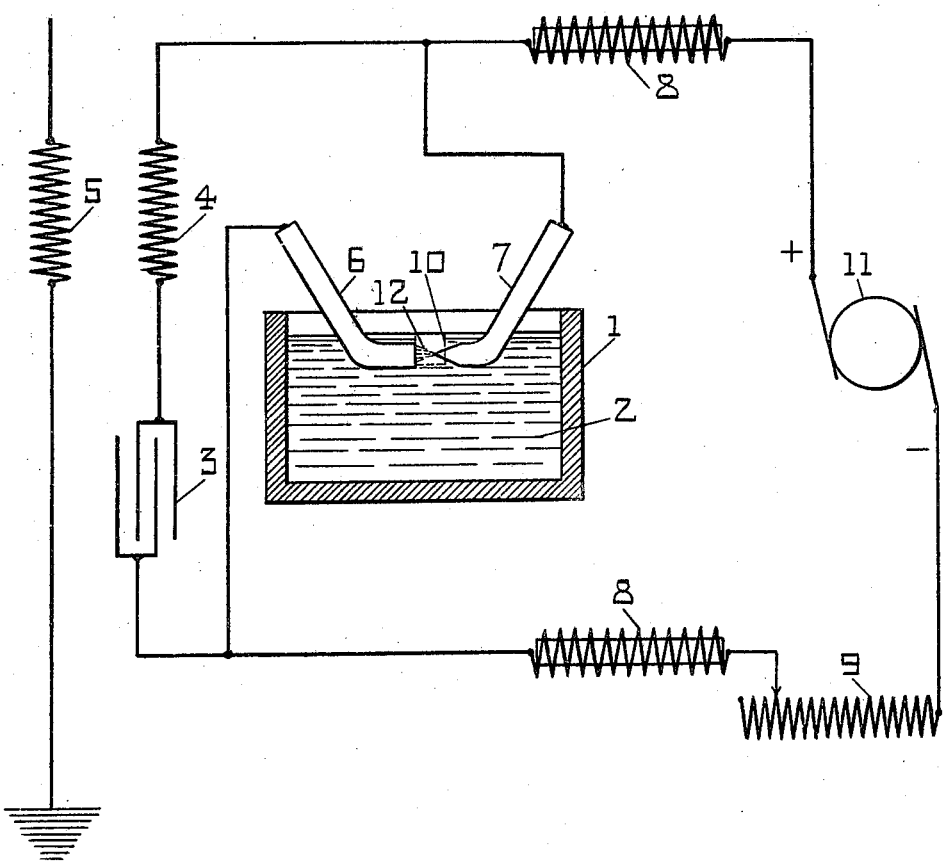

EDGAR S. BECK, OF TREICHLERS, PENNSYLVANIA.

APPARATUS FOR PRODUCING UNDAMPED ELECTRICAL OSCILLATIONS.

999,543.  Specification of Letters Patent.  Patented Aug. 1, 1911.

Application filed January 28, 1910. Serial No. 540,593.

*To all whom it may concern:*

Be it known that I, EDGAR S. BECK, a citizen of the United States, and a resident of Treichlers, in the county of Northampton and State of Pennsylvania, have invented new and useful Improvements in Apparatus for Producing Undamped Electrical Oscillations, of which the following is a specification.

This invention relates to an apparatus for changing continuous into alternating current or electrical oscillations, the apparatus being of that type in which the arc terminals or electrodes are submerged in an electrolyte and connected with a supply circuit of continuous current and with an alternating circuit including self-induction and capacity.

The invention has for its principal object to produce undamped electrical oscillations of greater efficiency and more uniformly by the use of electrodes of special design and located in a certain relation to the surface of the liquid in which the arcing extremities are submerged.

With current interrupters of this type, as heretofore employed, the terminals where the electric arc occurs are submerged to a considerable depth in the liquid and the heat of the arc causes bubbling of the liquid with the result that the strength and frequency of the electric oscillations are continually varying to such an extent as to render transmission of intelligence by such electrical oscillations inefficient. As the result of experiment, I have found that by placing the arc points of the electrodes close to the surface of the liquid, which is preferably, although not necessarily, distilled water, the arc will maintain a well or depression in the water immediately at the electrodes, the arc passing across the well from the extremity of one electrode to the other, and as the result, the detrimental effect of the bubbling of the water is overcome. It has further been found that by tapering the extremity of the positive electrode to a sharp point, an arc of high current density and steadiness can be obtained, a conical-like arc being created between the point and the relatively blunt end of the negative electrode.

With the foregoing objects in view, the invention comprises the various novel features of construction and arrangement of parts which will be more fully described hereinafter and set forth with particularity in the claims appended hereto.

In the accompanying drawing, the figure represents a diagrammatic view with the various electrical devices connected in circuit.

Referring to the drawing, 1 designates a receptacle containing a liquid solution which may be pure or distilled water, which is indicated at 2. The negative and positive electrodes 6 and 7 extend into the receptacle 1 and have the spark gap forming terminals submerged only slightly below the surface of the water. The negative electrode 6, which may be made of copper, iron, aluminum, zinc or other suitable metal, has its submerged extremity terminated bluntly in a transverse surface and the positive electrode 7, which may be made of copper, aluminum, iron, or other suitable metal, has its submerged extremity tapered to a sharp point, the apex of which is disposed in a central line extending at right angles to the blunt surface of the negative electrode. The outer extremities of the electrodes are connected to the opposite sides of a supply circuit which includes a source of continuous current 11, a current controlling adjustable resistance 9, and self-induction coils 8, said coils serving to prevent the alternating current from flowing toward the source of continuous current. The electrodes 7 and 8 are also part of an oscillatory circuit that includes a self-induction coil 4 and a condenser 3. Inductively related to the coil 4 is a loosely coupled oscillating transformer 5 which has one terminal grounded and the other terminal connected with the radiating antenna when the apparatus is used for transmitting intelligence by electric oscillations.

In operation, the electrodes are brought into engagement to close the circuit for the continuous current, slightly under the surface of the liquid in the vessel 1, and upon separation to form an arc gap, an arc 12 passes from the positive to the negative electrode and accompanying this arc is the formation of a well or depression 10 in the surface of the water immediately at the sparking terminals of the electrode. As a consequence the bubbling and disturbance of the water or liquid, due to the presence of the spark, as in other interrupters, is reduced to a minimum with the advantage that electrical oscillations are produced more efficiently and without variations in strength and frequency.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. An apparatus for producing electrical oscillations which consists of a vessel containing a body of liquid, an electrode having a blunt end submerged slightly below the surface of the liquid, another electrode having a pointed end slightly submerged below the surface of the liquid and arranged with its apex spaced from and in line with the center of the blunt end of the first electrode, a source of continuous current connected with the electrodes, and an oscillatory circuit connected with the electrodes.

2. An apparatus for producing electric oscillations including a container holding a body of liquid, a negative electrode having a blunt terminal submerged slightly below the surface of the liquid, a positive electrode having a pointed terminal slightly submerged in the liquid and disposed opposite the terminal of the negative electrode, a source of continuous current connected with the electrodes, and an alternating circuit including the said electrodes and also inductance and capacity.

In witness whereof I subscribe my signature in the presence of two witnesses.

EDGAR S. BECK.

Witnesses:
BENJAMIN F. HALL,
EDGAR E. HALL.